(No Model.)

G. M. WEIRICH.
FASTENING ARTIFICIAL TEETH.

No. 411,272. Patented Sept. 17, 1889.

WITNESSES:
P. F. Chagles.
L. Douville.

INVENTOR:
George M. Weirich
BY Wiedersheim & Fairbanks
ATTORNEYS.

UNITED STATES PATENT OFFICE.

GEORGE M. WEIRICH, OF PHILADELPHIA, PENNSYLVANIA, ASSIGNOR TO HENRY D. JUSTI, OF SAME PLACE.

FASTENING ARTIFICIAL TEETH.

SPECIFICATION forming part of Letters Patent No. 411,272, dated September 17, 1889.

Application filed April 29, 1889. Serial No. 308,970. (No model.)

*To all whom it may concern:*

Be it known that I, GEORGE M. WEIRICH, a citizen of the United States, residing in the city and county of Philadelphia, State of Pennsylvania, have invented a new and useful Improvement in Fastening Artificial Teeth, which improvement is fully set forth in the following specification and accompanying drawings.

My invention consists of novel means whereby an artificial tooth may be fastened or secured to the base-plate in an efficient and durable manner, as will be hereinafter fully set forth.

Figure 1:
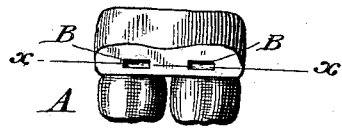
Figure 2:
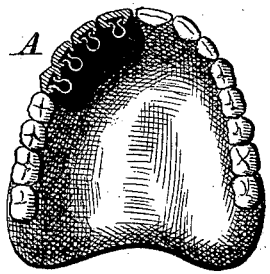
Figure 3:
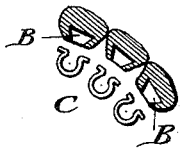
Figure 4:

Figure 1 represents a view of the inner faces of artificial teeth prepared for fastening in accordance with my invention. Fig. 2 represents a bottom plan view of a set of artificial teeth and the base-plate thereof on a reduced scale, including the fastening embodying my invention. Fig. 3 represents horizontal sections of artificial teeth and the fastenings therefor embodying my invention. Fig. 4 represents a section on line x x, Fig. 1, including a portion of the base-plate.

Similar letters of reference indicate corresponding parts in the several figures.

Referring to the drawings, A designates artificial teeth, in the back of which are horizontal slots B, the latter being undercut at their ends, which feature is well known in the art.

C designates loops which fasten the teeth to the base-plate, the same being formed of metallic wire or other proper material having sufficient strength and flexibility for requirements.

In carrying out my invention I proceed as follows: The ends of the loops are primarily brought together and then inserted in the slots B, after which said ends are released, so that they spring apart within said slots, forming in a measure dovetailed joints with the walls thereof, thus causing the engagement of the ends of the loops with the teeth. The base-plate is formed in any suitable manner, and a portion of the rubber, celluloid, or other material of the same is compressed into the slots of the teeth between the ends of the loops and around the bow portions of the same outside of the slots, so that both the inside and outside portions of the loop are thus embedded in the said base-plate and firmly connected therewith, and their ends are firmly connected with the teeth, thus tightly, efficiently, and durably fastening the teeth in position.

It will be seen that I may employ wire of much lower grade than platinum, as the same is not subjected to intense heat, as in the case where pins are burned into the teeth.

The shape of the fastening may be varied; hence I do not limit myself to the loop form shown.

Having thus described my invention, what I claim as new, and desire to secure by Letters Patent, is—

A fastening for a tooth, consisting of a piece of wire or other suitable material having its ends adapted to engage in a slot or recess in the back of the tooth, and a base-plate having some of its material in said slot closing on and embedding the fastening therein and some of the material closing on and embedding the portion of the fastening outside of said slot, the parts named being combined substantially as described.

GEORGE M. WEIRICH.

Witnesses:
JOHN A. WIEDERSHEIM,
A. P. JENNINGS.